C. D. WOODRUFF.
WATER PIPE SUPPORT.
No. 106,527.               Patented Aug. 16, 1870.
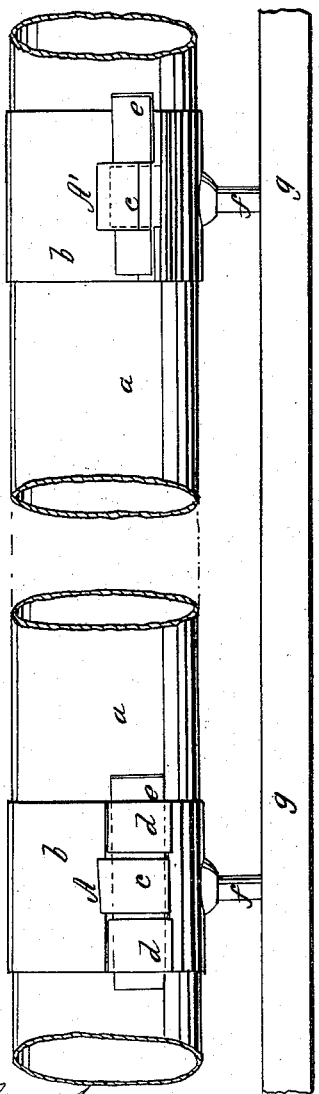
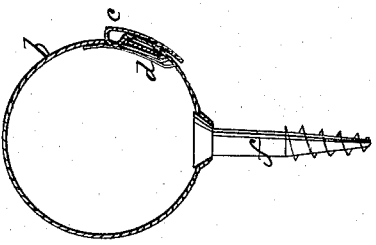
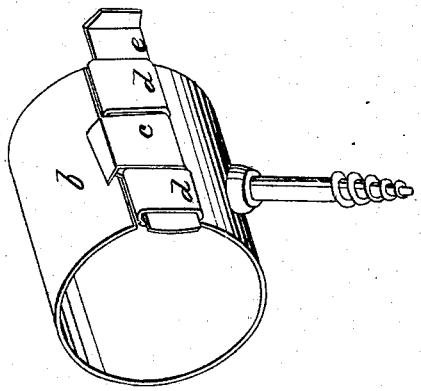
Witnesses,
V. C. Clayton
J. G. Clayton
Inventor,
C. D. Woodruff
by his attys
J. C. Clayton & Co.

United States Patent Office.

CHAUNCEY D. WOODRUFF, OF TOLEDO, OHIO.

Letters Patent No. 106,527, dated August 16, 1870.

IMPROVED WATER-PIPE SUPPORT.

The Schedule referred to in these Letters Patent and making part of the same.

To all whom it may concern:

Be it known that I, CHAUNCEY D. WOODRUFF, of Toledo, in the county of Lucas and in the State of Ohio, have invented certain new and useful "Improvements in Water-pipe Support;" and I do hereby declare that the following is a full, clear, and exact description thereof, reference being had to the accompanying drawings and to the letters of reference marked thereon, in which—

Figure 1 is a side view of the supporter.

Figure 2 is a detached section, showing the screw and the manner of its attachment to the band or adjustable ring.

Figure 3 is a view in section of the band, the mode of fastening it, and the screw attached thereto, by countersinking and soldering them together.

The nature of my invention consists in the mode of forming the band, of attaching it to the building, of fastening the band around the water-pipe, and supporting the same, as hereinafter set forth.

To enable others skilled in the art to make and use my invention, I will proceed to describe its construction and operation.

Fig. 1 represents the water-pipe in position, supported by the band and attached to the building by the screw, in which $a\ a$ is the pipe; $b$, the band surrounding the pipe; $d\ d$, the loops on one end; and $c$, the loop on the other end. The loops are formed by dies, and are struck up to the proper shape, and the ends of the band are also shaped by dies to fit over each other in lapping. These loops are made wedge-shape, so that, by inserting the key $e$, which is also made wedge-shape, being pressed through the loops, will draw the band tightly around the pipe, and thus hold it securely.

In fig. 2, the screw. The screw is attached to the band $b$ by first countersinking the band and inserting the screw into it, and then soldering them together, thus making them firm, so that the band cannot work loose from the screw.

Fig. 3 shows the band and screw with the band closed. I use a common screw for the above-described purpose.

In applying my invention, having the band and screw combined, I then screw the screw $f$ into the building in proper position, and, when the number required is set, the pipe is then placed within the bands, and then the loops $c$ and $d$ are brought to position, and the key $e$ is inserted through the loops and pushed in tightly therein, thereby the wedge-shape of both the loops and key drawing the band tightly on each pipe; and when all are thus secured, the pipe is held securely in position.

If at any time it is necessary to remove the pipe, it can be readily done by taking out the keys $e$ and opening the bands $b$.

One great improvement in my invention is, I use no soldering to set my pipes in whatever position they may be placed.

Having thus described my invention,

What I desire to secure by Letters Patent is—

The combination of the band with loops $c$ and $d\ d$, screw $f$, and key $e$, constructed and arranged substantially as described and for the purposes set forth.

In testimony that I claim the above-described certain new and useful water-pipe support, I have hereunto signed my name this 4th day of August, 1868.

C. D. WOODRUFF.

Witnesses:
OTTO REIDEMEISTER,
M. B. DOYLE.